(12) United States Patent
Martone et al.

(10) Patent No.: US 7,059,014 B2
(45) Date of Patent: Jun. 13, 2006

(54) TOOL RAIL CLEANING APPARATUS

(75) Inventors: Christopher J. Martone, Rochester, MI (US); Randall R. Sobocienski, New Boston, MI (US); Stephen J. Veryser, Grosse Pointe Woods, MI (US)

(73) Assignee: General Motors Corporation, Detroit, MI (US)

( * ) Notice: Subject to any disclaimer, the term of this patent is extended or adjusted under 35 U.S.C. 154(b) by 394 days.

(21) Appl. No.: 10/364,166

(22) Filed: Feb. 11, 2003

(65) Prior Publication Data

US 2004/0154120 A1    Aug. 12, 2004

(51) Int. Cl.
*A47L 5/26*    (2006.01)
*A47L 7/02*    (2006.01)
*B08B 9/27*    (2006.01)

(52) U.S. Cl. .......................................... 15/387; 15/409
(58) Field of Classification Search .................. 15/344, 15/383, 387, 406, 408, 409, 22.1, 28
See application file for complete search history.

(56) References Cited

U.S. PATENT DOCUMENTS

| 1,461,620 | A | * | 7/1923 | Knapp | 15/29 |
| 1,568,408 | A | * | 1/1926 | Miles et al. | 15/28 |
| 1,571,773 | A | * | 2/1926 | Force | 15/28 |
| 2,078,634 | A | * | 4/1937 | Karlstrom | 15/385 |
| 2,290,533 | A | * | 7/1942 | Campbell, Jr. | 15/385 |
| 2,812,155 | A | * | 11/1957 | Woodruff | 415/211.1 |
| 4,837,888 | A | * | 6/1989 | Maier | 15/387 |
| 5,107,568 | A | * | 4/1992 | Wade | 15/387 |
| 5,495,632 | A | * | 3/1996 | Baker | 15/4 |
| 5,862,568 | A | * | 1/1999 | Sjoberg | 15/304 |

* cited by examiner

*Primary Examiner*—Terrence R. Till
(74) *Attorney, Agent, or Firm*—Laura C. Hargitt

(57) ABSTRACT

An apparatus for cleaning at least one surface of tubular tool rails includes an elongated housing having a free end, at least one brush rotatably attached to the free end of the housing, and a motor attached to the housing. The motor is operable to rotate the at least one brush to clean the at least one surface of the tool rail when the brush contacts the at least one surface. A debris removal device is attached to the housing adjacent the brush.

17 Claims, 4 Drawing Sheets

TOOL RAIL CLEANING APPARATUS

BACKGROUND OF THE INVENTION

The present invention relates generally to cleaning devices and, in particular, to a tool rail cleaning apparatus.

Overhead tool rail systems, which are frequently utilized in manufacturing plants having assembly lines and are typically arranged in parallel with the assembly line, are well known. These overhead tool rail systems are utilized for hanging tools and the like that move along with the product being assembled for the use of the production line workers. The tools include a trolley assembly having wheels attached thereto that extends through an aperture in the tool rail in order for the wheels to cooperate with the tool rail to allow the tool to move along the rails. The wheels are typically constructed of nylon, neoprene, or similar materials. An end cap covers each end of the tool rail and is often used for adding and removing the trolley assemblies of the tools and for preventing the trolley assemblies from rolling off the end of the tool rails. The tool rails are often many feet in length and see prolonged use in the manufacturing plant.

After prolonged use, the tool rails eventually become contaminated with grease, dirt, grime, paint, and the like and must be cleaned in order for the wheels of the trolley assembly to roll smoothly. If the surface of the tool rails is contaminated, the rolling resistance of the nylon wheels on the trolley assembly increases. In prior art overhead rail systems, a common means for cleaning the rail surfaces after prolonged use and debris accumulation was to take down the overhead tool rails, remove all of the end caps and all of the trolley assemblies, and manually scrub the rails by reaching through the aperture in the tool rail. Another common means for cleaning the rail was to blow the debris from the tool rail using compressed air. If the manual scrubbing of the surfaces or the compressed air did not clean the surfaces, the rail would be discarded and replaced with a new rail. Other similar labor intensive and time-consuming maintenance practices were utilized in the prior art to clean the rail surfaces. The difficulty and time-consuming nature of this type of maintenance is the reason it was not often done, which led to many tool rails being replaced. Replacement tool rails are prohibitively expensive. Furthermore, contaminated tool rails often damaged the trolley assembly wheels, which required replacement of not only the tool rail but the trolley assembly as well.

It is desirable, therefore, to provide a means for cleaning existing tool rails in order to reduce the operating costs of a production line and to increase the time interval for replacing tool rails. It is also desirable to maximize the ergonomic benefits of the tool and trolley assemblies by reducing the rolling resistance of the trolley assembly wheels on the tool rails.

SUMMARY OF THE INVENTION

The present invention concerns an apparatus for cleaning a surface of tubular tool rails. The apparatus includes an elongated housing having a free end, at least one brush rotatably attached to the free end of the housing, and a motor attached to the housing. The motor is operable to rotate the at least one brush.

In operation, the at least one brush of the apparatus is placed in contact with at least one surface of the tool rail. The motor rotates the brush in order to clean and loosen debris from the surface of the tool rail. Alternatively, the apparatus includes a debris removal apparatus for removing the debris that has loosened from the at least one surface by the rotating brushes. The debris removal apparatus is preferably a venturi vacuum device that is placed adjacent the tool rail while the apparatus in use. Preferably, the venturi vacuum device is powered by the same power source, such as compressed air, that drives the motor.

Preferably, the apparatus is utilized to clean an interior surface of a tubular tool rail having an opening extending through a wall thereof. In operation, when the at least one brush and the free end of the housing are inserted through the opening in the wall of the tubular tool rail, the at least one brush contacts an interior surface of the wall and is rotated by said motor in order to clean the interior surface. Preferably, the surface to be cleaned is the surface on which the wheels travel in the tool rail. Preferably, the free end and the at least one brush of the apparatus are small enough to be inserted lengthwise through the opening in the wall of the tool rail yet wide enough so that when the free end is rotated ninety degrees, the at least one brush covers most of the interior surface of the rail.

The apparatus according to the present invention is operable to clean overhead rail systems without having to remove the tool trolley assemblies or the tool rail end caps. Brushes can also be attached to the free end of the housing to clean the outer surfaces of the tool rail if that portion is in use. The brushes can be advantageously sized to clean a number of surfaces of a tubular tool rail including, but not limited to, interior surfaces and exterior surfaces of tool rails as well as any other surface that the brushes may contact. The cleaning apparatus will advantageously remove debris that contaminates tool trolley assembly wheels, thus minimizing replacement cost and maximizing the ergonomic benefits of the tool through the reduction of rolling resistance of the trolley assembly wheels on the tool rail inner surface.

Overhead rail systems can be easily and quickly cleaned by an operator utilizing the apparatus in accordance with the present invention while standing on the ground. This eliminates the need, as in the prior art, to take the rails down, and pull out all the trolley assemblies and end caps in order to clean the tool rails. The cleaning apparatus also advantageously avoids the replacement of the trolley assemblies or tool rails or even both in some cases. The use of the cleaning apparatus will extend the life of the rail system, which advantageously reduces overall maintenance cost. Removal of debris on the inner surface of the tool rail will reduce the rolling resistance of the trolley wheel, which enables the assembly operator to move the suspended device more easily. Furthermore, a cleaner tool rail improves operator ergonomics.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
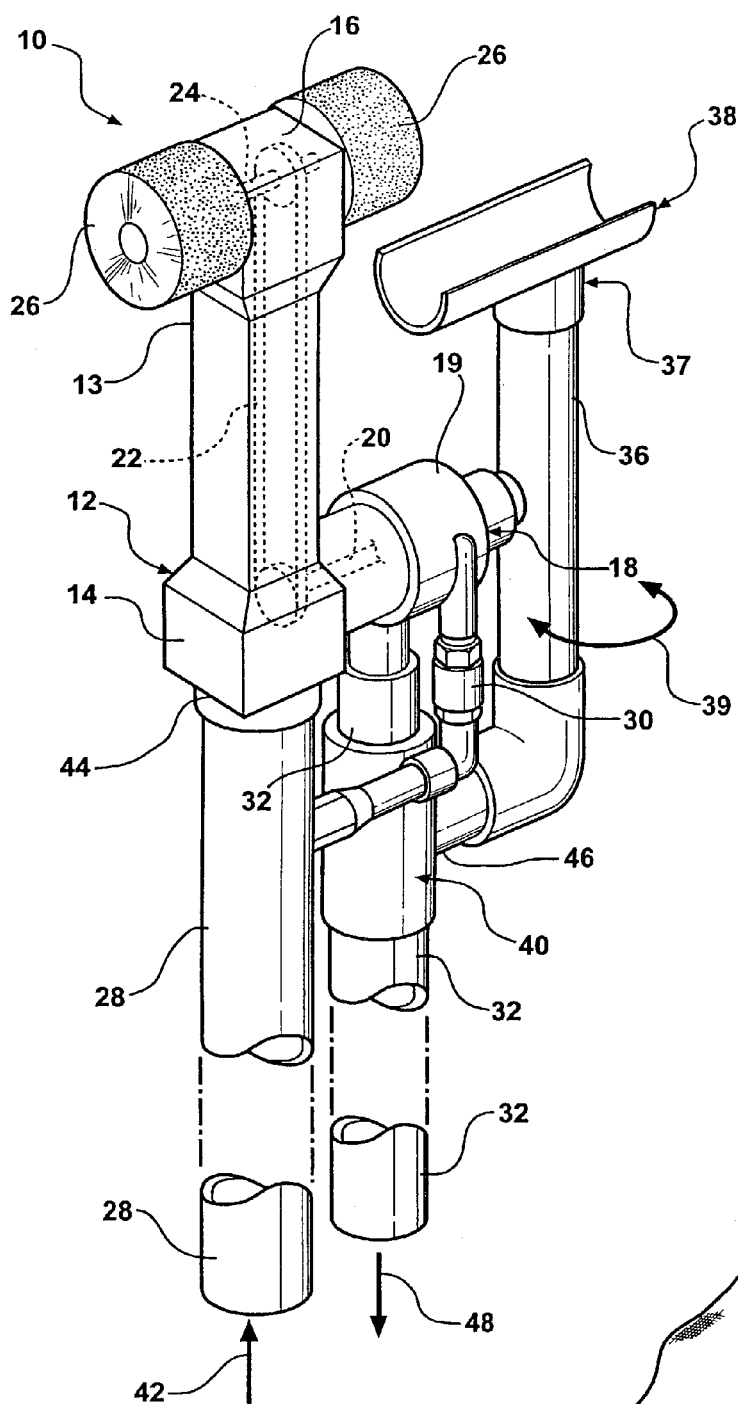
FIG. 1 is a perspective view in partial cross-section of a cleaning apparatus in accordance with the present invention.
Figure 2:
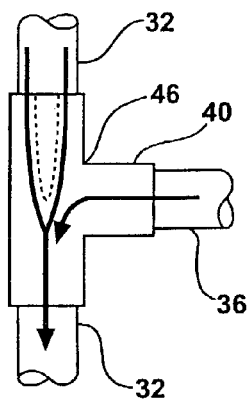
FIG. 2 is a schematic view of a portion of the cleaning apparatus in FIG. 1.

Referring now to FIG. 1, a cleaning apparatus in accordance with the present invention is indicated generally at 10. The cleaning apparatus 10 includes an elongated housing 12 having a hollow housing body 13 extending from a fixed end, 14 to a free end 16. The housing 12 is preferably constructed of aluminum or similar material. A motor 18 disposed in a motor housing 19 and having a motor shaft 20 extending therefrom is attached to the fixed end 14 of the housing 12. The motor 18 is preferably an air motor, or a similar type motor. A drive belt 22 engages an end of the motor shaft 20 by a pulley (not shown) or the like in the interior of the fixed end 14. The drive belt 22 extends towards the free end 16 and engages a pulley (not shown) or the like on an arbor 24 in the interior of the free end 16. A plurality of mounts (not shown) rotatably mount the arbor 24 to the free end 16 of the housing 12. The arbor 24 is attached to a plurality of brushes 26 on the exterior of the free end 16.

Figure 3:
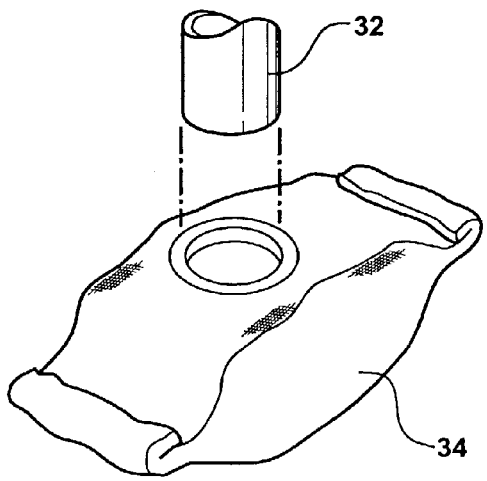
FIG. 3 is a perspective view of a filter for use with the cleaning apparatus in FIG. 1.

An elongated supply conduit 28 is connected to a power supply, such as a compressed air supply (not shown). The supply conduit 28 connects to a motor supply conduit 30, which is further connected to the motor housing 19. An elongated exhaust conduit 32 is connected to a lower portion of the motor housing 19. The exhaust conduit 32 extends to a filter 34, best seen in FIG. 3. A cleaning conduit 36 having an elongated and generally U-shaped collector member 38 attached at an upper end thereof connects to the exhaust conduit 32 at a tee 40. The longitudinal axis of the collector member 38 is generally parallel to a longitudinal axis of the arbor 24. The supply conduit 28 and the exhaust conduit 32 preferably extend a distance below the fixed end 14 of the housing 12 to be utilized for grasping and maneuvering the apparatus 10 during operation of the apparatus 10, outlined in more detail below. Alternatively, a handle (not shown) may be attached to each of the lower ends of the supply conduit 28 and the exhaust conduit 32 for grasping and maneuvering the apparatus 10 during operation.

In operation, compressed air (not shown) from a compressed air supply (not shown) is introduced into an end of the supply conduit 28 and flows in a supply direction indicated by an arrow 42. A blank member 44 located adjacent the fixed end 14 of the housing 12 forces the compressed air to flow from the supply conduit 28 to the motor supply conduit 30. The compressed air flows through the motor supply conduit 30, actuates the motor 18, and exhausts to the exhaust conduit 32 in an exhaust direction indicated by an arrow 48. The compressed air travels through the exhaust conduit 32, through the tee 40 and into the filter 34. The diameters of the tee 40 and the cleaning conduit 36 allow the compressed air flowing through the tee 40 to create a lower pressure area at a junction 46 of the cleaning conduit 36 and the tee 40. The cleaning conduit 36, the collector member 38, and the tee 40, when attached, form a debris removal apparatus, indicated generally at 37. The debris removal apparatus 37 is a venturi vacuum device that is placed adjacent a tool rail while the cleaning apparatus 10 is in use, outlined in more detail below.

When the motor 18 is actuated by the compressed air flowing through the motor supply conduit 30, the motor 18 rotates the shaft 20, which in turn activates the drive belt 22. The drive belt 22 then rotates the arbor 24, which in turn rotates the brushes 26.

Figure 4:
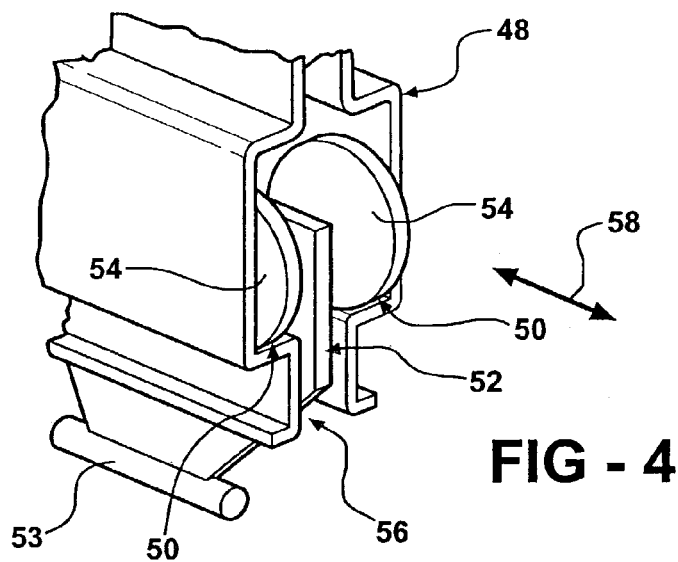
FIG. 4 is fragmentary perspective view of a tool rail for use with the cleaning apparatus in FIG. 1.

Referring now to FIG. 4, a tubular tool rail is indicated generally at 48. The tool rail 48 includes an interior surface 50 on an inner portion thereof. A trolley assembly 52 having a plurality of wheels 54 rotatably attached thereto is disposed in the inner portion of the tool rail 48. The trolley assembly 52 is adapted to be have a tool (not shown) attached to a portion 53 extending downwardly through an opening 56 in the wall of the tool rail 48. The wheels 54 engage the interior surface 50 to allow the trolley assembly 52 to move in a lateral direction indicated by an arrow 58 along the longitudinal axis of the tool rail 48. The tool rail 48 also includes at least one end cap (not shown) attached at an end (not shown) thereof for limiting the movement of the trolley assembly 52 in the direction 58 and keeping the trolley assembly 52 attached to the tool rail 48.

Figure 5:
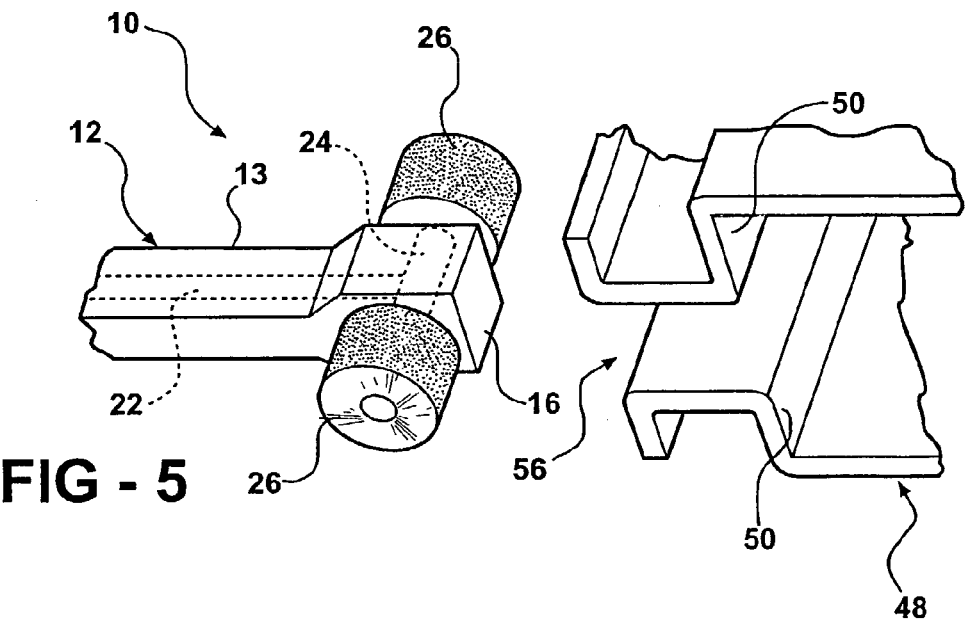
FIG. 5 is a fragmentary perspective view of the cleaning apparatus shown in FIG. 1 and the tool rail shown in FIG. 4 in an unengaged position.
Figure 6:
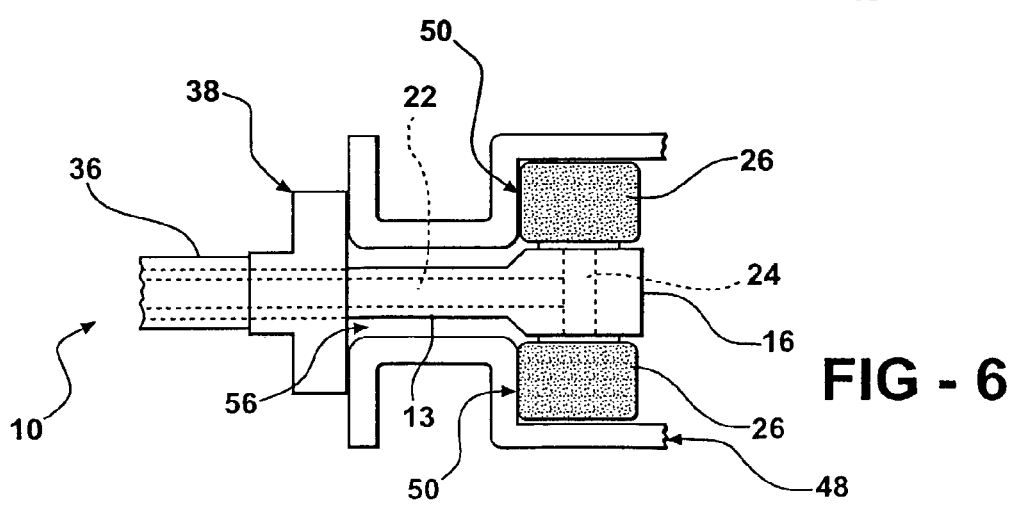
FIG. 6 is a side view of the cleaning apparatus and the tool rail shown in FIG. 5 in an engaged position for cleaning.

Referring now to FIGS. 5 and 6, in operation, the cleaning apparatus 10 is used to clean the interior surfaces 50 of the tool rail 48. The free end 16 of the housing 12 is placed adjacent the opening 56 in the tool rail 48. The free end 16 and the brushes 26 are preferably sized to easily pass through the opening 56 when the longitudinal axis of the arbor 24 is arranged in parallel with the longitudinal axis of the tool rail 48, as seen in FIG. 5. After the free end 16 and the brushes 26 are inserted in the opening 56, the housing 12 is rotated ninety degrees to orient the outer surfaces of the brushes 26 with the interior surfaces 50 of the tool rail 48 as shown in FIG. 6. The brushes 26 are preferably sized to cover most of the interior surface 50 of the tool rail 48.

When the motor 18 is actuated by the compressed air flowing through the motor supply conduit 30, the motor 18 rotates the shaft 20, which in turn rotates the drive belt 22. The drive belt 22 then rotates the arbor 24, which in turn rotates the brushes 26. The outer surfaces of the rotating brushes 26 are in contact with the interior surfaces 50 of the tool rail and clean the interior surfaces 50 of dirt, grime, and the like.

When the free end 16 and the brushes 26 are inserted in the opening 56, the collector member 38 of the debris removal apparatus 37 is placed in contact with an exterior surface of the tool rail 48. As the rotating brushes 26 clean the interior surfaces 50, the low pressure developed at the junction 46 pulls air and any debris (not shown) loosened by the action of the brushes 26 away from the inner portion of the tool rail 48, through the collector member 38 and the cleaning conduit 36 and eventually to the filter 34 via the exhaust conduit 32. The collector member 38 of the debris removal apparatus 37 is preferably spaced a predetermined vertical distance below the periphery of the brushes 26 approximately equal to that of the thickness of the wall of the tool rail 48 to allow for the collector member 38 to seal along the edges of the opening 56 and to be able to remove debris from the inner portion of the tool rail 48. The filter 34 traps any debris freed from the interior surfaces 50 of the tool rail 48 while allowing the compressed air to flow to atmosphere, maintaining air flow to keep the motor 18 operating and the low pressure area at the junction 46. The debris removal apparatus 37, therefore, advantageously utilizes the same compressed air source to remove the loosened debris via the collector member 38 and the exhaust conduit 32 that is used to drive the motor 18 and the brushes 26 in order to clean the interior surfaces 50 of the tool rail 48.

Figure 7:
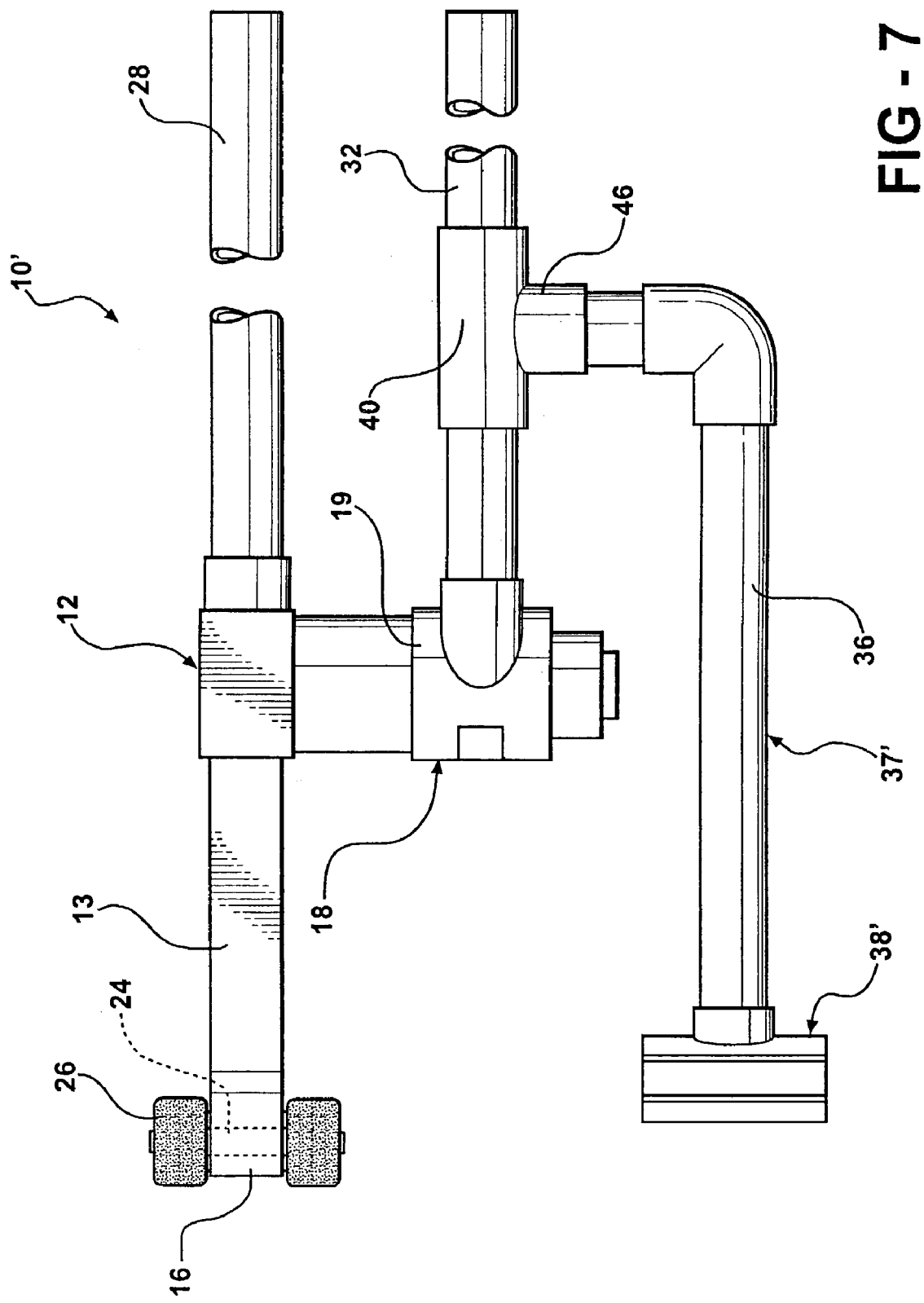
FIG. 7 is a perspective view of an alternative embodiment of a cleaning apparatus in accordance with the present invention.

Referring now to FIG. 7, an alternative embodiment of a cleaning apparatus in accordance with the present invention is indicated generally at 10'. An alternative debris removal apparatus is indicated generally at 37' and includes an elongated and generally C-shaped collector member 38' attached to the cleaning conduit 36. The collector member 38' is preferably blocked off at each opposed end thereof to allow for debris to be collected easier during operation, discussed in more detail below. The longitudinal axis of the collector member 38' is generally parallel to the longitudinal axis of the arbor 24. The collector member 38', the cleaning conduit 36, and the exhaust conduit 38 are adapted to rotate about the longitudinal axis of the exhaust conduit 32 by virtue of a bearing-type connection (not shown) or similar connection between an upper portion of the exhaust conduit 32 and the motor housing 19.

Figure 8:
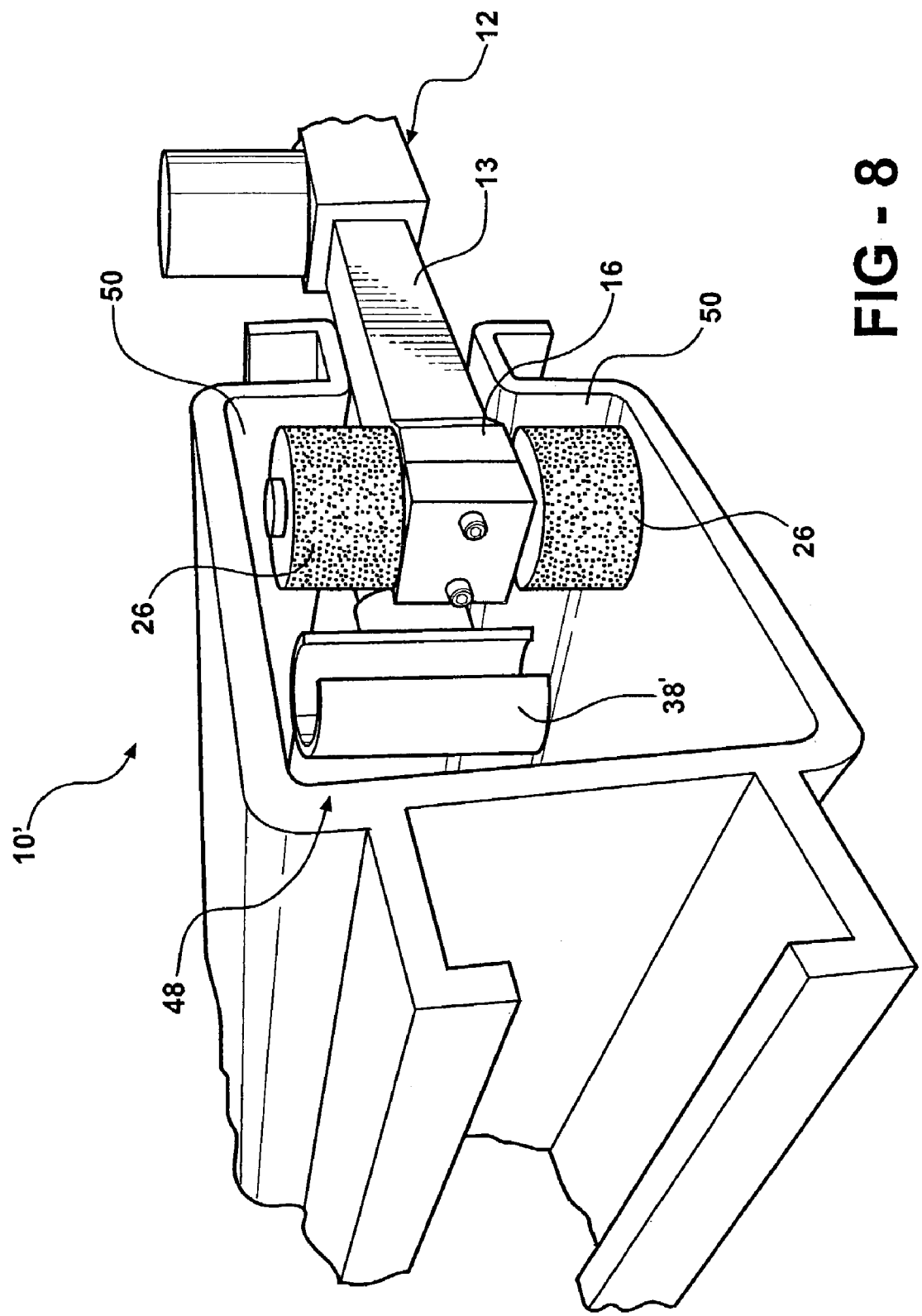
FIG. 8 is a perspective view of the cleaning apparatus shown in FIG. 7 engaged for cleaning with a tool rail shown in FIG. 4.

Referring now to FIGS. 7 and 8, the cleaning device 10' is operated in the same manner as the cleaning device 10. When the free end 16 and the brushes 26 are inserted in the opening 56, the collector member 38' is also inserted in the opening 56. After the free end 16, the brushes 26, and the collector member 38' are inserted in the opening 56, the housing 12 is rotated ninety degrees to orient the outer surfaces of the brushes 26 with the interior surfaces 50 of the tool rail 48. When the housing 12 is rotated ninety degrees, the collector member 38', the cleaning conduit 36, and the exhaust conduit 32, by virtue of the bearing-type connection between the upper portion of the exhaust conduit 32 and the motor housing 19, rotate about the longitudinal axis of the exhaust conduit 32. The collector member 38' rotates and pivots towards the brushes 26 in the opening 56, orienting the collector member 38' towards to brushes 26, as shown in FIG. 8.

The collector member 38 of the debris removal apparatus 37' is preferably at a distance from the motor 18 equal to that of the periphery of the brushes 26 to allow for the collector member 38 to be oriented towards the brushes 26 when located adjacent the interior surfaces 50, best seen in FIG. 8, in order to remove debris from the inner portion of the tool rail 48. The collector member 38' is preferably sized to cover most of the interior surface 50 of the tool rail 48.

The cleaning apparatus 10 and 10' is operable to clean overhead rail systems, such as the tool rail 48, without having to remove the trolley assemblies 52 or the end caps. The cleaning apparatus 10 and 10' is operable to be utilized from a much lower position than the tool rail 48, allowing a rail tool rail 48 located overhead, such as in an automotive assembly line, to be cleaned from the ground or floor below the tool rail 48. Additional brushes (not shown), similar to the brushes 26 can be attached to the housing 12 at the free end 16, the fixed end 14, or otherwise in order clean the outer surfaces of the tool rail 48 if that portion is in use. The apparatus 10 and 10' in accordance with the present invention will remove debris on the interior surfaces 50 that contaminates tool trolley support wheels 54, thus minimizing replacement cost for the tool rails 48 and maximizing the ergonomic benefits of the tool through the reduction of rolling resistance of the trolley wheels 54 on the tool rail interior surface 50.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the apparatus 10 and 10' has been described as utilizing a compressed air source to drive the motor 18 and a drive belt 22 to drive the arbor 24, those skilled in the art will realize that various types of prime movers and mechanical connections may be utilized to drive the motor 18 and various means for actuating the brushes 26 may be utilized while remaining within the scope of the present invention. In addition, those skilled in the art will realize that various means for removing the loosened debris from the inner portion of a tubular tool rail may be utilized while remaining within the scope of the present invention.

The invention claimed is:

1. An apparatus for cleaning an interior surface of a tubular tool rail extending in a first longitudinal direction and including a slotted opening extending in the first longitudinal direction having a predetermined width normal to the first longitudinal direction, with the interior surface facing away from the slotted opening, the apparatus comprising:

an elongated housing having a free end and a housing body extending in a second longitudinal direction, the housing body including a portion adjacent to the free end that has lateral dimensions small enough to allow rotation about an axis normal to the first longitudinal direction when the portion adjacent to the free end is located in the slotted opening;

a brush extending laterally from the free end of the housing having a rotation axis that is generally normal to the second longitudinal direction, with the brush having a diameter that is less than the predetermined width of the slotted opening and a brush width such that a combined width including the brush width and the free end of the elongated housing is wider than the predetermined width of the slotted opening, and wherein the brush is contactable with the interior surface when the portion of the elongated housing adjacent to the free end is located in the slotted opening;

a second brush extending laterally from the free end of the housing in opposed relation to the brush and rotatable about the rotation axis; and an air motor, drivable by a stream of air flow through the motor, operatively engaging the brush and the second brush to selectively cause rotation of the brush about the rotation axis.

2. The apparatus of claim 1 further including a debris removal apparatus having a vacuum pressure generatable from the stream of air flow.

3. The apparatus of claim 2 wherein the debris removal apparatus includes a collector member in proximity to but spaced from the brush and the second brush and a cleaning conduit extending between the collector member and the stream of air flow.

4. The apparatus of claim 3 wherein the collector member has a first dimension that is narrower than the predetermined width of the slotted opening and a second dimension that is wider than the predetermined width of the slotted opening, wherein the collector member is insertable within the slotted opening and rotatable relative to the tubular tool rail while in the slotted opening.

5. The apparatus of claim 3 wherein the cleaning conduit extends to an exhaust portion of the stream of air flow, with the exhaust portion being downstream of the air motor.

6. The apparatus of claim 1 wherein the motor is an air motor that is drivable by a stream of air flow through the motor.

7. The apparatus of claim 6 further including a debris removal apparatus having a vacuum pressure generatable from the stream of air flow.

8. The apparatus of claim 7 wherein the debris removal apparatus includes a collector member in proximity to but spaced from the brush and the second brush and a cleaning conduit extending between the collector member and the stream of air flow.

9. The apparatus of claim 8 wherein the air motor includes an exhaust conduit through which the stream of air is directed after passing through the air motor, and the exhaust conduit includes a venturi effect feature, and the cleaning conduit operatively engages the exhaust conduit at the location of the venturi effect feature.

10. An apparatus for cleaning an interior surface of a tubular tool rail extending in a first longitudinal direction and including a slotted opening extending in the first longitudinal direction having a predetermined width normal to the first longitudinal direction, with the interior surface facing away from the slotted opening, the apparatus comprising:
   an elongated housing having a free end and a housing body extending in a second longitudinal direction, the housing body including a portion adjacent to the free end that has lateral dimensions small enough to allow rotation about an axis normal to the first longitudinal direction when the portion adjacent to the free end is located in the slotted opening;
   a first brush extending laterally from the free end of the housing having a rotation axis that is generally normal to the second longitudinal direction, with the first brush having a diameter that is less than the predetermined width of the slotted opening, and wherein the first brush is contactable with the interior surface when the portion of the elongated housing adjacent to the free end is located in the slotted opening;
   a second brush extending laterally from the free end of the housing in opposed relation to the first brush and rotatable about the rotation axis, and the second brush having a diameter that is less than the predetermined width of the slotted opening, and wherein the first brush has a first brush width and the second brush has a second brush width such that a combined width including the first bush width, the second brush width and the free end of the elongated housing is wider than the predetermined width of the slotted opening; and
   an air motor, drivable by a stream of air flow through the motor, operatively engaging the first brush and the second brush to selectively cause rotation of the first brush and the second brush about the rotation axis.

11. The apparatus of claim 10 further including a debris removal apparatus having a vacuum pressure generatable from the stream of air flow.

12. The apparatus of claim 11 wherein the debris removal apparatus includes a collector member in proximity to but spaced from the brush and the second brush and a cleaning conduit extending between the collector member and the stream of air flow.

13. The apparatus of claim 12 wherein the collector member has a first dimension that is narrower than the predetermined width of the slotted opening and a second dimension that is wider than the predetermined width of the slotted opening, wherein the collector member is insertable within the slotted opening and rotatable relative to the tubular tool rail while in the slotted opening.

14. The apparatus of claim 12 wherein the air motor includes an exhaust conduit through which the stream of air is directed after passing through the air motor, and the exhaust conduit includes a venturi effect feature, and the cleaning conduit operatively engages the exhaust conduit at the location of the venturi effect feature.

15. An apparatus for cleaning an interior surface of a tubular tool rail extending in a first longitudinal direction and including a slotted opening extending in the first longitudinal direction having a predetermined width normal to the first longitudinal direction, with the interior surface facing away from the slotted opening, the apparatus comprising:
   an elongated housing having a tree end and a housing body extending in a second longitudinal direction, the housing body including a portion adjacent to the free end that has lateral dimensions small enough to allow rotation about an axis normal to the first longitudinal direction when the portion adjacent to the free end is located in the slotted opening;
   a brush extending laterally from the free end of the housing having a rotation axis that is generally normal to the second longitudinal direction, with the brush having a diameter that is less than the predetermined width of the slotted opening, and wherein the brush is contactabie with the interior surface when the portion of the elongated housing adjacent to the free end is located in the slotted opening;
   an air motor, drivable by a stream of air flowing through the air motor, operatively engaging the brush to selectively cause rotation of the brush about the rotation axis; and
   a debris removal apparatus including a collector member in proximity to but spaced from the brush, and a cleaning conduit extending between the collector member and the stream of airflow, with the cleaning conduit having a longitudinally extending portion extending parallel to and spaced from the elongated housing and a lateral portion operatively engaging the stream of air flow to create a vacuum pressure in the cleaning conduit.

16. The apparatus of claim 15 wherein the air motor includes an exhaust conduit through which the stream of air is directed after passing through the air motor, the exhaust conduit includes a venturi effect feature, and the lateral portion of the cleaning conduit operatively engages the exhaust conduit at the location of the venturi effect feature.

17. The apparatus of claim 15 further including a second brush extending laterally from the free end of th housing in opposed relation to the brush and rotatable about the rotation axis, with the air motor operatively engaging the second brush to selectively cause rotation of the second brush about the rotation axis.

* * * * *